UNITED STATES PATENT OFFICE.

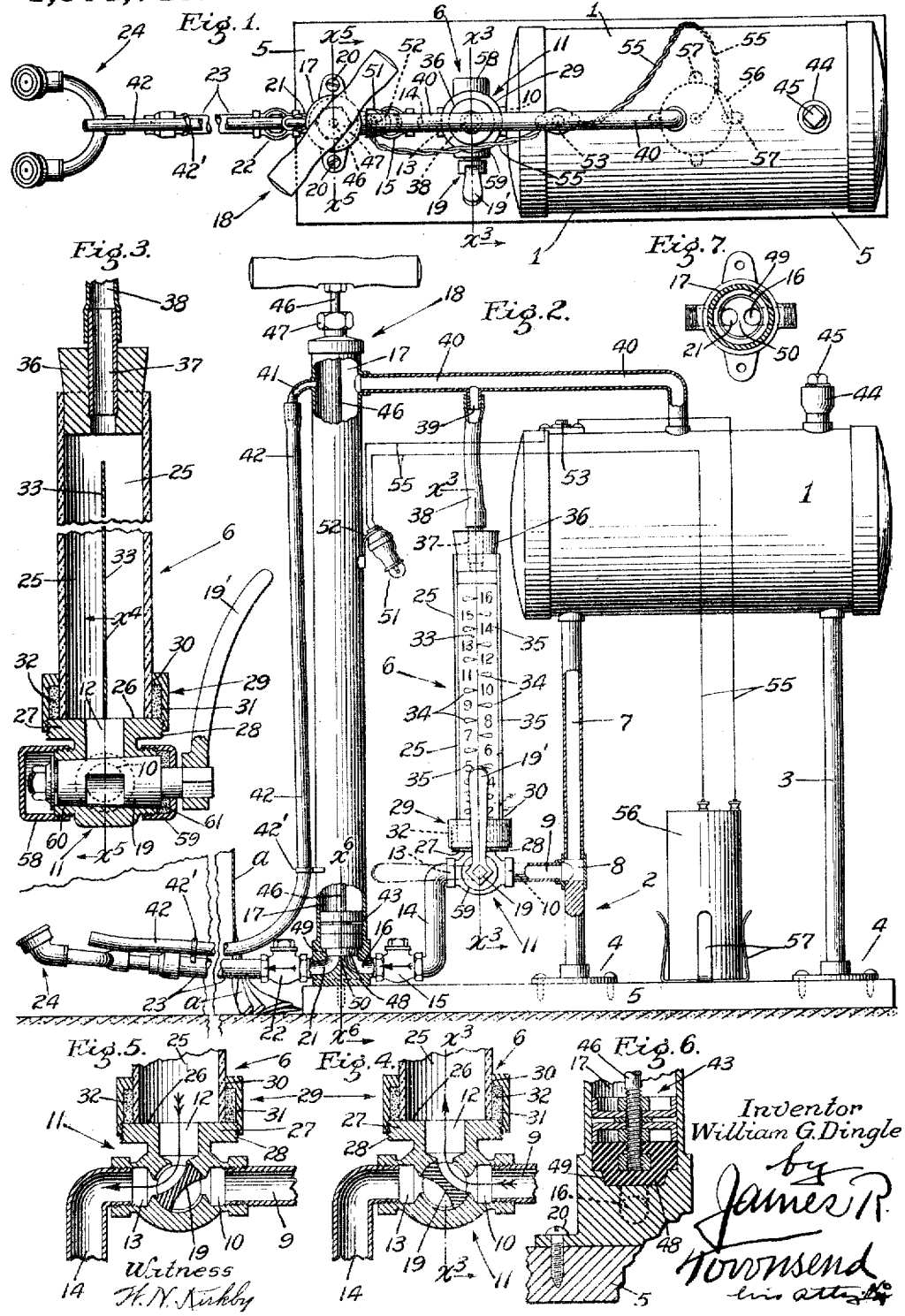
W. G. DINGLE.
FUMIGATING AND SPRAYING APPARATUS.
APPLICATION FILED MAY 5, 1917.
1,304,746. Patented May 27, 1919.
Inventor
William G. Dingle
by James R. Townsend
his atty
Witness
H. N. Kirkby

WILLIAM G. DINGLE, OF LOS ANGELES, CALIFORNIA.

FUMIGATING AND SPRAYING APPARATUS.

1,304,746.  Specification of Letters Patent.  Patented May 27, 1919.

Application filed May 5, 1917. Serial No. 167,119.

*To all whom it may concern:*

Be it known that I, WILLIAM G. DINGLE, a citizen of the United States, residing at Los Angeles, in the county of Los Angeles and State of California, have invented a new and useful Fumigating and Spraying Apparatus, of which the following is a specification.

This invention relates to an apparatus for use in carrying out the newly discovered method of fumigating set forth in application for Letters Patent of the United States, Serial No. 167,120, filed by me cotemporaneously herewith and which involves spraying into a confined space liquid hydrocyanic acid that is adapted to expand into a poisonous gas to permeate the air surrounding pests in such space. While this invention relates more particularly to apparatus for spraying liquid hydrocyanic acid which at certain temperatures expands into the atmosphere to form a gas, I do not wish to limit it to such use.

The fumigation of citrus and other trees by the use of hydrocyanic acid is usually done at night, and it is necessary, in order to obtain the best results, that the quantity of hydrocyanic acid used for any tree shall be apportioned to suit the conditions of the tree and the pests and the amount and condition of the air contained within the inclosure in which the fumigation is to be effected.

An object of this invention is to provide means whereby a predetermined quantity of the liquid may be sprayed at each operation and whereby the fumigation can be conveniently, expeditiously and successfully conducted at night without danger to the operators.

An object is to provide a light, simple and portable apparatus of this character which may be supplied with liquid hydrocyanic acid and readily carried from tree to tree by the operator, and by which the hydrocyanic acid may be effectually sprayed into the confined space under a tent without danger to the operator or attendant. Liquid hydrocyanic acid generates high pressures under moderate temperatures, and an incidental of the invention is the provision of safe vent means for the apparatus, whereby all gas and vapor arising from, and any air and vapor coming into contact with the liquid during its passage through the apparatus is excluded from the outside atmosphere and vented into the space within which the fumigation is to be effected.

Another object is to provide interchangeable gage or measuring means for a graduate whereby the proportion of liquid to the cubical contents of the space to be fumigated may be readily changed according to the variety and conditions of growth treated, there being a series of gages, each having a scale to determine the depth of the liquid in the graduate and consequently the quantity in the charge, so that the fumigation may be conducted by rule for any particular variety of growth.

Another object is to avoid the leakage of poisonous liquid or gases while the apparatus is not in use.

The invention may be carried out in various forms.

An object is to provide a construction and arrangement of the apparatus which will be especially adapted to convenient hand transportation and operation in orchards at night.

An object is to provide for convenient and safe inspection of the graduate to note the charge to be delivered for any one fumigation.

Although the apparatus is intended for use in fumigating with gas arising from liquid hydrocyanic acid, it is understood that its use may be extended to spraying other liquids.

An object is to allow a safe venting of gas that might create dangerous pressures.

Other objects and advantages may appear from the accompanying drawing, the subjoined detail description and the appended claims.

The accompanying drawings illustrate the invention.

Figure 1 is a plan of a fumigating apparatus embodying this invention, a portion of the spray pipe and vent tube being broken away to contract the view.

Fig. 2 is a side elevation, the spray pipe and vent tube being broken away as in Fig. 1 and the apparatus being in position to deliver a charge under a fumigation tent, a portion of which is shown. Parts are shown in section for clearness of illustration.

Fig. 3 is a fragmental enlarged detail partly in mid-section on line $x^3$, Figs. 1, 2 and 4, showing the three-way control valve opened to admit a charge of liquid hydrocyanic acid to the graduate as in Figs. 1, 2 and 4.

Fig. 4 is a fragmental section on line $x^4$—$x^5$, Fig. 3, with the valve in a position corresponding to that shown in Fig. 3.

Fig. 5 is a fragmental section on line $x^4$—$x^5$, Fig. 3, showing the valve turned to admit the graduated charge to the pump.

Fig. 6 is a fragmental axial section on line $x^6$, Figs. 1 and 2, illustrating the lower portion of the pump structure.

Fig. 7 is a cross section of the pump chamber, showing the floor in plan.

In the embodiment shown a supply tank 1 is mounted on upright standards 2, 3, that are provided with feet 4 suitably fixed to a portable base 5.

The graduate container 6 in communication with the tank is arranged to receive a charge of liquid therefrom, said tank preferably being positioned at a sufficient height to permit the graduate to be filled therefrom by gravity flow.

In the form of apparatus shown the standard 2 is provided with an upper pipe section 7 that is connected through T 8 and lateral pipe 9 with the inlet 10 of a three-way valve housing 11 that forms the bottom of the graduate and has a way 12 open into said graduate. A passage is thus formed from the supply tank to the graduate through pipe 7, T 8, pipe 9, three-way valve inlet 10, chamber of housing 11, and way 12. The valve outlet 13 is connected by the downwardly extending pipe connection 14 with a check valve 15 that communicates through port 16 with the bottom of a pump-chamber 17 to thus form a passage-way through which the liquid may flow from the graduate by operation of the force-pump 18. A valve 19 provided with a handle 19' controls the flow to and from said graduate and is adapted to alternately open communication between the tank and graduate and between the graduate and pump.

The pump may be of any suitable type and is shown as a hand pump fixed to the base 5 at the front thereof, by screws 20. The pump is provided with an outlet 21 leading from the bottom of the pump-chamber 17 and communicating through a check-valve 22 with a spray pipe 23 that is provided with a suitable spray nozzle 24 through which the liquid is discharged by the action of the pump when operated after said nozzle has been inserted within the inclosure formed by the fumigating tent *a*. The liquid thus discharged expands into the atmosphere in the form of a gas which acts to destroy all animal and insect life within the inclosed space.

The graduate body 25 is preferably formed of an upright open-ended transparent glass tube, one end of which seats upon an upper face 26 of an externally threaded annular flange 27 of three-way valve housing 11. Said flange is of a diameter somewhat greater than the outside diameter of the tube and is provided with threads 28 to receive a packing nut 29 that has at its top an inwardly extending annular flange 30 which fits and slides on the tube. There is thus formed between the glass tube and the inner annular wall 31 of the nut an annular packing space, when the tube is slipped through the orifice 30; said space being filled with suitable packing 32 which is compressed as the nut is screwed down upon the threads with the tube seating upon the valve housing face 26, to thus pack the bottom of the tube and prevent any leakage.

The graduate is provided with suitable indicator or gage means to determine the quantity of liquid in a charge delivered to said graduate from the supply tank. The amount of liquid required for a charge is proportional to the cubical contents of the tent or other fumigating inclosure and varies according to the character of the pest and the vegetable growth to be treated. For this reason it is desirable that a series of gages be provided, each having a scale for a particular variety of growth. With this end in view the gage shown in a metal strip 33 substantially corresponding in width to the inside diameter of the glass tube, and diametrically positioned within the tube. In practice the gage is inserted through the open top of the tube 26 and rests upon the face 26 of the valve housing. A scale with indices 34 to indicate ounces or other measure, together with upwardly increasing ordinals 35 on the strip serve to indicate the quantity of liquid in the charge as the level of liquid rises.

The graduate body or tube 25 is adapted to be closed to the external air and is vented at its upper end to the supply tank and pump to allow the liquid charge to flow into and from said tube and to prevent any escape of fumes to the external air.

To this end a vented closure 36 having a nipple 37 is adjustably connected by a flexible tube 38 to a nipple 39 on a horizontal vent pipe 40, that leads from the supply tank 1 to the upper end of the pump chamber 17. The closure 36 is removably inserted into the upper end of the tube 25. The top of the pump chamber 17 has a vent nipple 41 on which is fitted a tube 42 that extends down alongside the pump to the spray pipe 23, to which it is secured by fasteners 42' so as to discharge close to the nozzle, and at a distance from the pump.

This vent arrangement serves to exclude from the outside atmosphere, and to direct to the fumigating inclosure all vapor or fumes and all air arising from or coming into contact with the poisonous liquid, and balances the pressures; first, at the time of filling the tank 1 with the poisonous liquid; second, as the liquid rises in the graduate during delivery thereto of a charge from the supply tank; third, upon the up-stroke of the plunger 43 in the pump chamber 17, to suck the liquid from the graduate to the pump, and fourth, when the pump plunger is depressed to spray the charge into the tent or other inclosure. The venting tube 42 conveys the expelled vapor, gas or air to the tent or other inclosure.

The inlet 44 at the top of the tank 1 is utilized for filling the tank and is tightly closed by any suitable means as the plug 45.

The usual plunger-rod 46, working through stuffing box 47, is attached to the pump-plunger 43, which in the present instance is provided with a stopper 48 that is offset and adapted to tightly fit on and in the lower seat 49 when the plunger is down at the end of its stroke. Said stopper 48 is adapted to close both the inlet 16 and the outlet 21 of the pump chamber, and to seat upon the partition 50 that extends between said inlet and outlet, thus serving to isolate the inlet from the outlet and to prevent leakage from the graduate to the nozzle 24.

Said stopper is made of soft rubber and is adapted to close the inlet and outlet of the pump so that neither liquid vapor nor gas will pass.

The check valves 15, 22 open in the same direction from the graduate toward the nozzle, and are oppositely arranged relative to the pump so that when valve 19 is turned as in Fig. 4, the upstroke of plunger 43 opens valve 15 and the charge of liquid flows from the graduate to the pump, while valve 22 shuts to prevent air from being sucked in through the nozzle. Upon downstroke of the plunger, the valve 15 shuts to prevent return of liquid toward the graduate, while valve 22 opens to allow the liquid to be forced through the spray pipe 23 and nozzle 24.

Since the fumigating treatment is usually applied at night and the vapor and gas arising from the liquid hydrocyanic acid is highly inflammable, it is desirable that a ready and safe light be provided in order that the liquid charges in the graduate may be read. To this end an electric lamp 51 is mounted on the pump by a clip 52, in position to illuminate the graduate, and is connected through electric circuit 55 with a battery 56 mounted on the base 5 between spring clips 57. A switch-button 53 is suitably arranged, as on the tank where it may be readily pressed to switch on the current to light the lamp 51 whenever it is desired to inspect the graduate.

To prevent any leakage of liquid or escape of poisonous fumes or gases through the three-way valve seat, the valve housing 11 is provided with caps 58, 59 that screw onto the valve seat bosses 60 to inclose the ends of the valve 19, and the cap 59 through which the graduate valve stem passes is provided with packing 61.

The time during which a tree should be subjected to the gas varies under various conditions and in order to advantageously fumigate an orchard, it is desirable that a sufficient number of trees be inclosed in separate tents to allow the fumigation of the first tree to be completed before the acid charge is sprayed into the last tent, so that the first tent may be removed from its fumigated tree and placed over an unfumigated tree, and so on as the work proceeds.

When the pump is not in use the plunger is pushed down into the position shown in Figs. 2 and 6, thus closing the outlet from the graduate to the nozzle 24.

In practice the operator will fill tank 1 with liquid hydrocyanic acid at a sufficiently low temperature to guard against vaporization during the filling operation. Before unscrewing the plug 45, the three-way graduate valve-handle 19' is brought to upright position as shown in Fig. 2, thereby closing the graduate inlet 10 as shown in Fig. 5. When the tank has been filled to the required extent, the plug 45 is screwed home again. Then the operator will grasp the handle formed by the horizontal pipe 40 and will carry the apparatus to a tent $a$ which has been placed over a tree, not shown, for the purpose of fumigating the same, and will insert the nozzle 24, pipe 23 and tube 42 under the tent. If the work is to be done in the dark, he will then press the button 53 to cause the lamp 51 to illuminate the scale 33 and will then turn the handle 19' into the position shown in broken lines in Fig. 2, thus opening the inlet 10 into the graduate as shown in Fig. 4. He will then note the rise of liquid in the graduate, and when the predetermined required charge for that particular tree has flowed into the graduate he will turn the handle 19' to the horizontal position shown in solid lines in Fig. 2, thus opening the outlet 13 as indicated in Fig. 5.

During all this time the plunger has been fully depressed, thus closing the passages 16 and 21. The operator will then operate the pump plunger up and down to draw the liquid hydrocyanic acid charge into the pump and to expel it therefrom through the nozzle 24 into the air contained in the space under the tent. The nozzle 24 is constructed to spray or vaporize the liquid; and the temperature maintained under the tent during the treatment is such as to cause the atomized or vaporized liquid to expand into hydrocyanic acid gas, which permeates the air surrounding the tree and, in a determined period of time, will destroy the insect life on the tree. As soon as the liquid has been thus sprayed under the tent, the workman will lift the apparatus by the handle 40 and proceed to the tent that is over the next tree where a like operation will be performed and so on until the fumigation of all the tent-covered trees is accomplished. The tents are respectively removed from treated to untreated trees in the usual manner as soon as the treated trees have been subjected respectively to the gas for the required time.

In preparation for fumigating an orchard, a chart may be made showing the amount of liquid required to fumigate each tree, and as the work proceeds, the operator will refer to the chart to determine how much liquid should be delivered to each tree and will operate the graduate valve accordingly. The amount of each charge will be in proportion to the contents of the tent inclosure and may be indicated in terms of ounces or other measure by the indices on the gage 33. When the level of the liquid rises to the predetermined height, the valve handle 19′ is then turned into the dot-and-dash position indicated in Fig. 2, whereupon the valve shuts off communication between the tank and graduate and opens communication between the graduate and pump-chamber 17 (see Fig. 5) and the charge then flows through check valve 15 and into the compartment at the bottom of said chamber upon the inlet side of the partition 50, the plunger 48 checking the further advance of the charge. As the plunger is raised on its upstroke the charge is sucked into the chamber 17, and upon the downstroke of said plunger it is forced through the check valve 22, into the spray pipe 23 and through the nozzle 24 where it gasifies and permeates the inclosed air around the inclosed tree. The nozzle may then be removed from under the tent and the apparatus carried to another tree preparatory to injecting another charge.

For convenience of carrying the apparatus during the shifting of the center of gravity as the liquid in the tank lowers, the handle 40 is of convenient length as it extends from the tank to the pump.

The gage plate is made removable for the purpose of changing the scale for different kinds of work. Only one gage plate is shown but any desired number of gage plates may be provided and whenever it is desired to change the scale the graduate controlling valve 19 is turned to close the inlet 10 and the closure 36 is pulled out of the glass graduate tube 25, the gage plate is withdrawn and the desired plate inserted in its place. Then the closure 36 is reinserted and the apparatus is again in condition for operation.

I claim:

1. The combination with a supply tank, of measuring means to receive a charge of liquid from the tank, a nozzle, means to discharge the liquid charge through the nozzle into an inclosure, and vent means communicating with the tank and the measuring, and discharge means, and adapted to communicate with the inclosure.

2. The combination with a supply tank, of a graduate to receive a charge of liquid from said tank, a nozzle connected with said graduate and adapted to spray into an inclosure, a pump to draw the charge from the graduate and expel the same through said nozzle, and vent means adapted to extend into the inclosure and connecting said tank, graduate, and pump.

3. The combination with a supply tank, of a graduate to receive a charge of liquid from said tank, a nozzle connected with said graduate and adapted to spray into an inclosure, a pump to draw the charge from the graduate and expel the same through said nozzle, and vent means leading from the graduate and tank and adapted to communicate with the inclosure.

4. The combination with a supply tank, of a graduate to receive a charge of liquid from said tank, a pump-chamber provided with an inlet at the bottom thereof to admit a charge from the graduate, an outlet at the bottom of said chamber, a spray nozzle communicating with said outlet, an axial partition at the bottom of the chamber and positioned intermediate said inlet and outlet, and a plunger working in the pump-chamber and adapted to seat upon said partition to thus prevent leakage through to the nozzle.

5. The combination with a supply tank, of an upright graduate to receive a charge of liquid from said tank, a pump-chamber communicating with said graduate, a controlling valve at the bottom of said graduate and adapted to alternately open communication between the tank and graduate and between the graduate and pump-chamber, a spray nozzle communicating with said pump-chamber and adapted to spray into an inclosure, a plunger working in said chamber and adapted to suck in the liquid charge from the graduate upon its upstroke and to expel said charge through the nozzle upon its down-stroke, vents leading from the supply tank and graduate to the pump-chamber, and a vent leading from the pump-chamber to communicate with the inclosure, said vents serving to balance pressures and exclude evolved gases from the outside atmosphere.

6. In combination, a supply tank, a graduate to receive a charge of liquid from said tank, a nozzle connected with said graduate and adapted to spray the liquid charge into an inclosure at night, an electric lamp mounted in position to illuminate the graduate, a switch to throw said current on during filling of the graduate, and a pump to draw the charge from the graduate to expel the same through said nozzle.

7. The combination with a base of a pump mounted on the base and provided with a discharge pipe; a supply tank; means connected to the base to support the supply tank; a pipe extending from the lower part of the tank and connected with the pump; a graduate connected to said pipe, a three-way valve for alternately directing liquid from the tank to the graduate and from the graduate to the pump; and a vent pipe connecting to each other the upper parts of the tank, the graduate and the pump; and a vent pipe leading from the pump.

8. The combination with a supply tank, a pump connected thereto, a nozzle connected to the pump and a graduate tube between the tank and the pump, of a vented removable closure for the graduate to allow a scale to be inserted and withdrawn and vent means leading from the vented closure to discharge at a distance from the pump.

9. In a fumigating apparatus having a pump, a nozzle connected therewith and a graduate from which the pump draws liquid to be sprayed through the nozzle, a removable gage in the graduate and a vented closure for the top of the graduate to allow the gage to be inserted and withdrawn therefrom.

In testimony whereof, I have hereunto set my hand at Los Angeles, California, this 27th day of April 1917.

WILLIAM G. DINGLE.

Witness:
JAMES R. TOWNSEND.

Copies of this patent may be obtained for five cents each, by addressing the "Commissioner of Patents, Washington, D. C."